United States Patent [19]

Schmalzried

[11] Patent Number: 5,671,806
[45] Date of Patent: Sep. 30, 1997

[54] CHARGE AIR COOLER

[75] Inventor: Günther Schmalzried, Korb, Germany

[73] Assignee: Behr Industrietechnik GmbH & Co., Stuttgart, Germany

[21] Appl. No.: 649,236

[22] Filed: May 17, 1996

[30] Foreign Application Priority Data

May 30, 1995 [DE] Germany ............... 195 19 633.3

[51] Int. Cl.[6] ............................................. F28F 7/00
[52] U.S. Cl. ................ 165/81; 165/152; 165/DIG. 51
[58] Field of Search .............................. 165/81, 146, 149, 165/152

[56] References Cited

U.S. PATENT DOCUMENTS

| | | | |
|---|---|---|---|
| 3,228,461 | 1/1966 | Seekins | 165/81 |
| 4,049,051 | 9/1977 | Parker | 165/166 |
| 5,033,540 | 7/1991 | Tategami et al. | 165/135 |
| 5,555,930 | 9/1996 | Lu | 165/81 |

FOREIGN PATENT DOCUMENTS

| | | | |
|---|---|---|---|
| 177609 | 7/1993 | Austria. | |
| 2342787 | 3/1975 | Germany. | |
| 3722605A1 | 1/1982 | Germany. | |
| 3705938A1 | 9/1988 | Germany. | |
| 3906747A1 | 9/1990 | Germany. | |
| 60-60498 | 4/1985 | Japan | 165/81 |
| 1099687 | 1/1968 | United Kingdom | 165/152 |

OTHER PUBLICATIONS

German Search Report Nov. 30, 1995 Germany.

*Primary Examiner*—Allen J. Flanigan
*Attorney, Agent, or Firm*—Evenson McKeown Edwards & Lenahan, PLLC

[57] ABSTRACT

A charge air cooler is provided in which, in use, the charge air enters a finned tube block at very high temperatures creating a problem in that the lamella-type corrugated fins heat up abruptly and expand in the transverse direction. In order to eliminate the resulting risks of damage, the finned tube block on the air inlet side is provided with expansion joints extending in parallel to the tubes. The expansion joints extend only to a selected depth into the finned tube block in the air flow direction, which depth is selected such that the temperature of the charge air has already dropped there to such an extent that damage as a result of thermal expansions is no longer a concern.

13 Claims, 4 Drawing Sheets

CHARGE AIR COOLER

BACKGROUND AND SUMMARY OF THE INVENTION

This invention relates to a charge air cooler having a finned tube block which is constructed particularly of flat tubes and lamella-type corrugated fins each arranged between these flat tubes and is inserted in a fixed frame which is constructed of two opposed water boxes and of two lateral parts connecting the latter.

It is known that, in the case of charge air coolers of this type, which are used particularly for large-scale engines and engines for commercial vehicles, air temperatures of up to 250° C. may occur on the charge air inlet side. The wall temperatures of the tubes on the air inlet side may therefore become higher than 110° C. so that a harmful boiling and condensation may occur in the interior of the tubes. In order to avoid this excessive heating of the first tubes coming in contact with the hot charge air and the resulting local vapor bubble formation with an erosion or with the precipitation of hardening agents and salts, it is known (German Patent Document DE-OS 23 42 787) to remove the fins in the first tube rows or to arrange a heat insulation there and to increase the number of fins in the flow direction of the charge air. However, these measures require relatively high expenditures and a profound change of the finned tube block which also causes a certain lowering of the performance.

For compensating the longitudinal extension between the finned tube block and lateral parts, it is also known (German Patent Document DE 37 05 938 C2), instead of using cumbersome sliding bottoms, to select the relationship of the coefficients of thermal expansion of the material of the lateral parts and of the tubes of the finned tube block approximately inversely proportional to the relationship of the mean temperatures to be expected in the operation.

However, all these measures cannot prevent that the lamella-type corrugated fins, even on the air inlet side, in each case expand abruptly when the charge air temperature changes with each gas push and is raised, for example, from 50° to 230° C. as often occurs during operation. In this case, the relatively thin air lamella heat up abruptly which may lead to an expansion of the corrugated fins in the transverse direction of approximately 2 mm (construction height approximately 600 mm) as a result of the high fin density and of the resulting relatively stiff fin connection. Such a change of measurements resulting from the thermal expansion can no longer be absorbed by way of elastic movements so that the outer air lamellae will buckle between the stiff connection of the lateral parts. Because of the continuously repeated temperature changes of the charge air temperatures, tears will then occur there on the air lamellae which, in turn, will have the result that the assigned water duct lacks the support and breaks of the material or cracks on the coolant-carrying flat tube may also occur here.

It is therefore an object of the invention to construct an air charge cooler of the initially mentioned type such that the expansion of the corrugated fins in the transverse direction to be expected during the operation cannot result in any damage.

For achieving this object, it is provided according to preferred embodiments of the invention that a gap is provided, at least at one point, which gap extends in parallel to the tubes and which is used as an expansion joint and extends along the length of the tubes but in the flow direction of the air only to a depth of the finned tube block at which a temperature of the air is reached which no longer causes a thermal expansion of the corrugated fins leading to an overstressing of the material.

As a result of this development, at least one compensating gap or, even better, two compensating gaps are provided in the area of the charge air inlet where the high temperatures are to be expected; but the remaining finned tube block remains unchanged. A division of the finned tube block into several partial blocks arranged next to one another and the resulting increasing loss of performance are therefore not necessary. Nevertheless, the dangerous transverse expansion of the corrugated fins is absorbed in the area in which damage is to be expected as a result of expansions.

As a further development of the invention, the expansion joint can be formed by the mutual spacing of two corrugated fins which have only a fraction of the width between adjacent tubes, which each rest against a tube wall and are soldered to it. As result of this measure, in contrast to the initially mentioned suggestion where the corrugated fins are completely removed in the inlet area of the charge air, a sufficient pressure support can be achieved of the tube walls facing the expansion joint. Corrugated fins in the known development or in the known development as a turbulence surface, if they are soldered to the tube wall, have a sufficient supporting force for avoiding a denting of the flat tubes at these points.

In a further development of the invention, the width of the corrugated fins provided in the area of the expansion joint may amount to approximately one third of the distance between adjoining tubes. The remaining expansion joint will then also have a width of one third of the distance between adjoining tubes. It was found that when, in the case of customary charge air coolers, two of such gaps are distributed along the width of the inlet side, this gap size is sufficient for the desired absorption of the longitudinal extension. Because of the high specific cooling performance, the charge air of, for example, an inlet temperature of 230° C., has already cooled off at a depth of the finned tube block of approximately 60 mm to a value of 120° C. This is a temperature value at which a damage of the corrugated fins as a result of a transverse expansion and lacking elastic support no longer has to be feared.

In order to supplement the suggestion according to the invention, in the areas in which no expansion joints are provided between adjacent tubes, in the remaining inlet area of the air inlet, corrugated fins may be assigned between adjacent tubes, the heat transmission capacity of the corrugated fins being lower than that of those of the preferably slotted corrugated fins provided behind them. Thus, advantageous preferred embodiments of the invention have smooth metal bands which are only accordion-folded to be provided as corrugated fins in the inlet area approximately along one third or one fourth of the length of the expansion joints, the cooling surface of these metal bands being small in comparison to the corrugated fins otherwise used for the manufacturing of finned tube blocks. In this case, the arrangement of such corrugated fins takes place essentially in the inlet area of the cooler in which the lateral parts and the water boxes form a surrounding, ring-type flange which has a particular stiffness. It is particularly important in this inlet area to avoid a transverse expansion as much as possible and also maintain the initially mentioned prerequisites in order to avoid damages also within the tubes.

As a further development of the invention, it may finally also be provided that, in the case of a charge air cooler with cooling ducts arranged in the lateral parts, these cooling ducts directly adjoin the corrugated fins assigned to the lateral parts so that the corrugated fins, at least in the area of the lateral parts, are cooled and can largely be excluded from a longitudinal expansion in the transverse direction. In this case, on the side facing the corrugated fins, the cooling ducts may be bounded by thin metal wall sheets which are soldered to the corrugated fins.

Inversely, the heat of the outermost air lamella is transmitted to the coolant side and, by means of the direct contact of the coolant with the lateral part material, a temperature approximation of the lateral parts to the adjoining coolant duct is achieved. As a result, the longitudinal expansions of the lateral part and the coolant duct are approximated and tension excesses are therefore avoided.

Other objects, advantages and novel features of the present invention will become apparent from the following detailed description of the invention when considered in conjunction with the accompanying drawings.

DETAILED DESCRIPTION OF THE DRAWINGS

Figure 1:
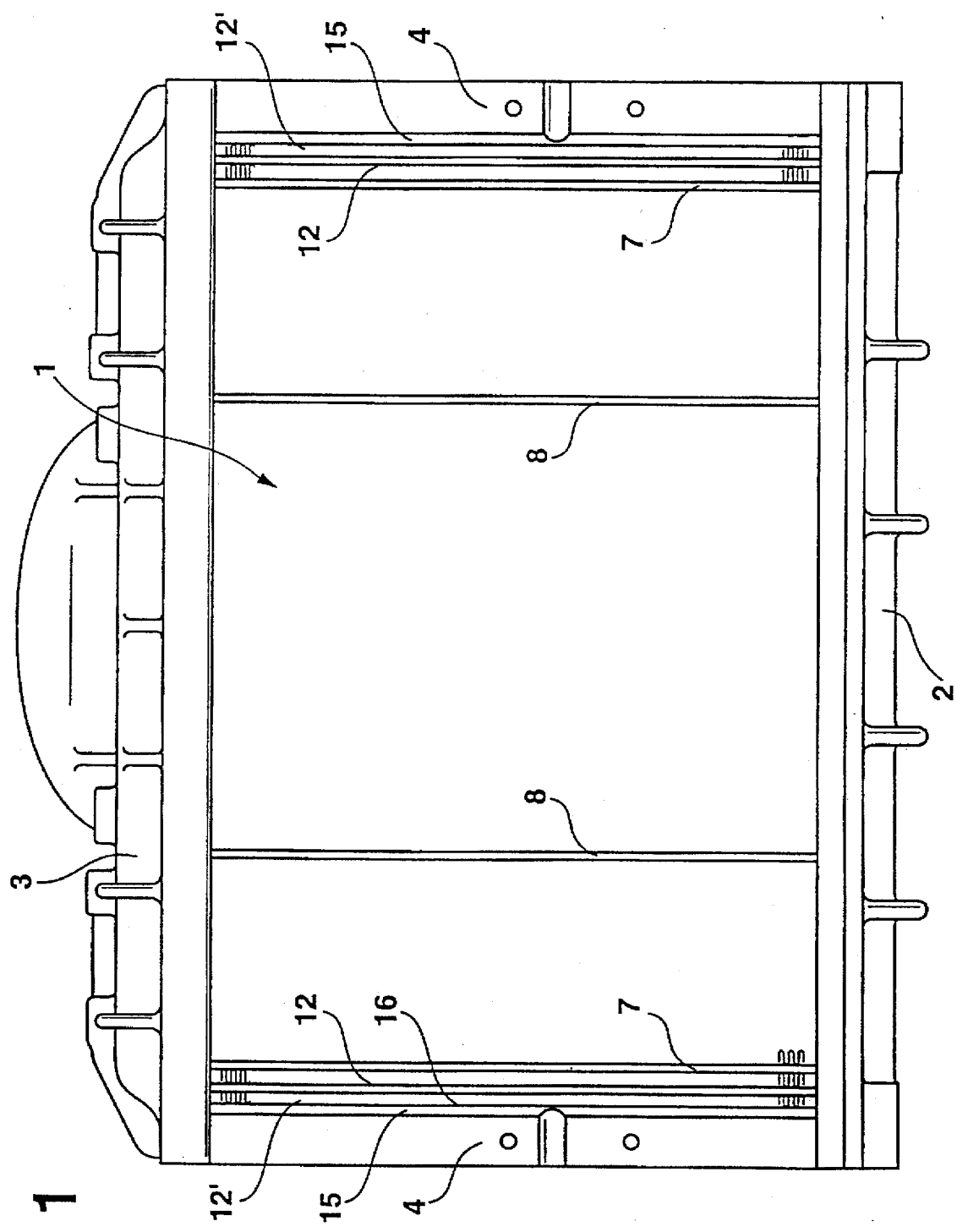
FIG. 1 is a frontal view of a charge air cooler constructed according to the invention.
Figure 2:
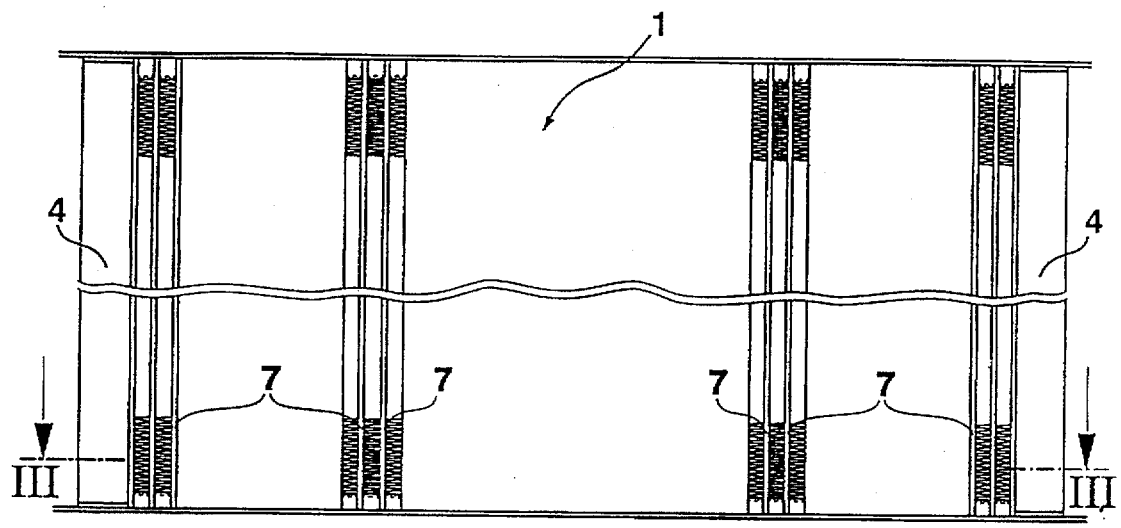
FIG. 2 is a schematic representation of the finned tube block of the charge air cooler of FIG. 1.
Figure 3:
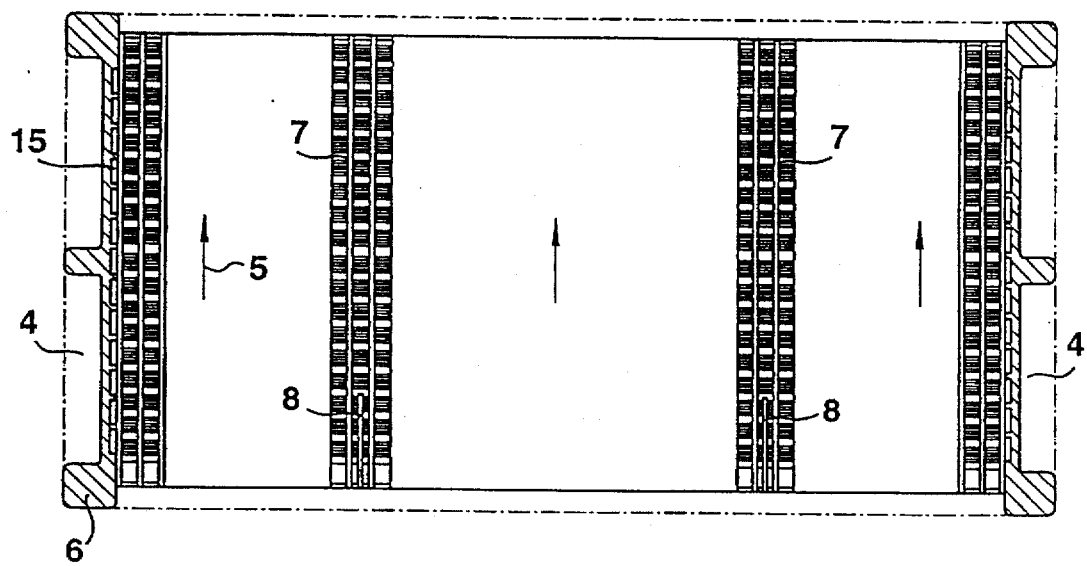
FIG. 3 is a sectional view of the finned tube block of FIG. 2 and the adjoining lateral parts, taken along Line III—III.

FIGS. 1 to 3 show that a finned tube block 1 is clamped into a rigid frame which consists of two opposed water boxes 2 and 3 and the two lateral parts 4. As illustrated in FIG. 3, in this case, the lateral parts 4 form a flange 6 which is situated transversely to the flow direction 5 of the air, is used for mounting fastening points and is particularly stiff.

The finned tube block 1 is constructed of a number of flat tubes 7 held next to one another and behind one another in the tube bottoms which are not shown in detail, which flat tubes are each distributed at an equal distance from one another uniformly on the whole inlet cross-section of the charge air cooler. FIGS. 2 and 3 as well as 4 and 5 show only the flat tubes 7 arranged in the area of the lateral parts 4 and two additional flat tubes arranged symmetrically with respect to a longitudinal center plane of the finned tube block 1.

As illustrated in FIG. 1 and 3, respective expansion joints 8 are formed between these two center tube pairs. Although, in this case, these expansion joints extend along the whole length of the tubes 7, thus approximately from the lower water box 2 to the upper water box 3, they extend only along a partial length of the finned tube block depth in the flow direction 5 of the air. In the case of the embodiment shown, the depth of the expansion joints 8 is determined such that, in this plane of the finned tube block extending in each case through the ends of the expansion joints 8, air temperatures are measured which are at approximately 120° C. The hot inlet air with temperatures of approximately 230° C. has therefore cooled down into this end plane of the expansion joints 8 to such an extent that the temperature increase to be expected in this area can no longer result in any damage.

Figure 4:
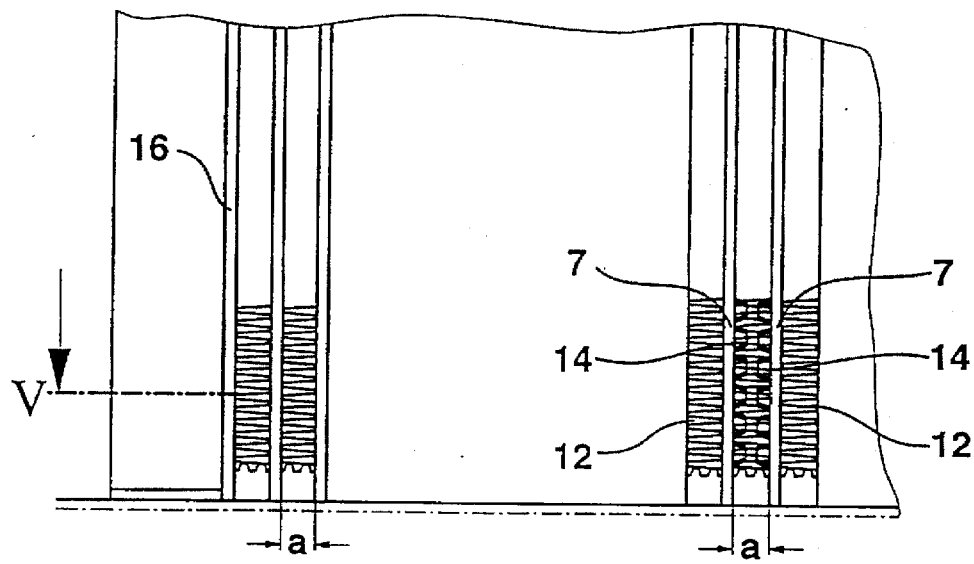
FIG. 4 is an enlarged representation of a detail of the left lower area of the finned tube block of FIG. 2.
Figure 5:
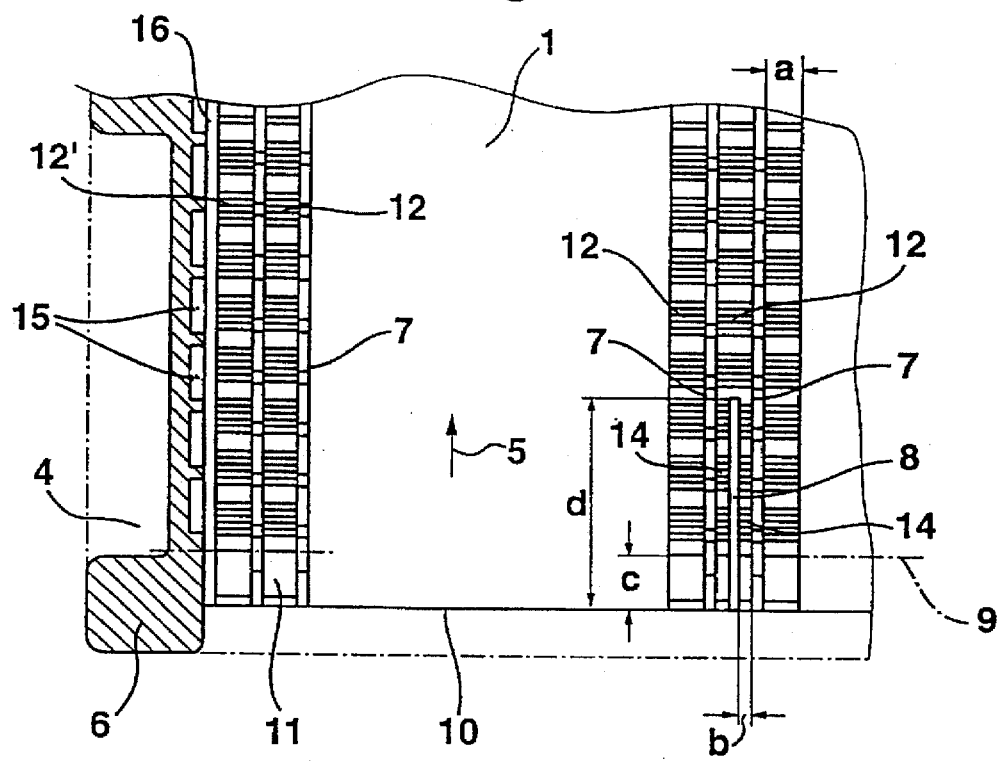
FIG. 5 is an enlarged representation of the left lower partial area of FIG. 3.
Figure 6:
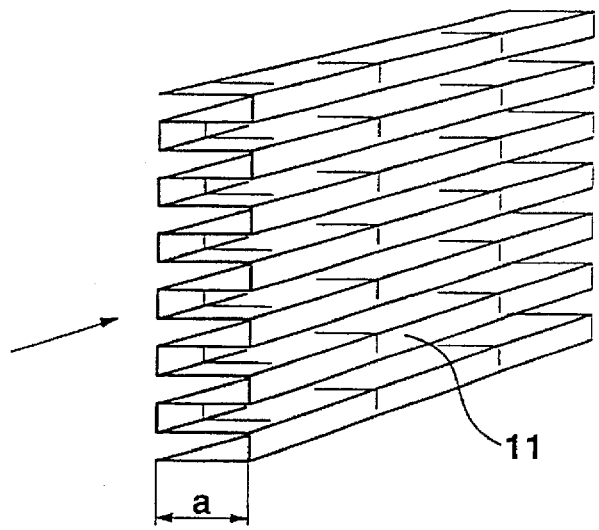
FIG. 6 is a schematic perspective partial view of a corrugated fin used for the construction of the finned tube block of FIGS. 2 to 5.
Figure 7:
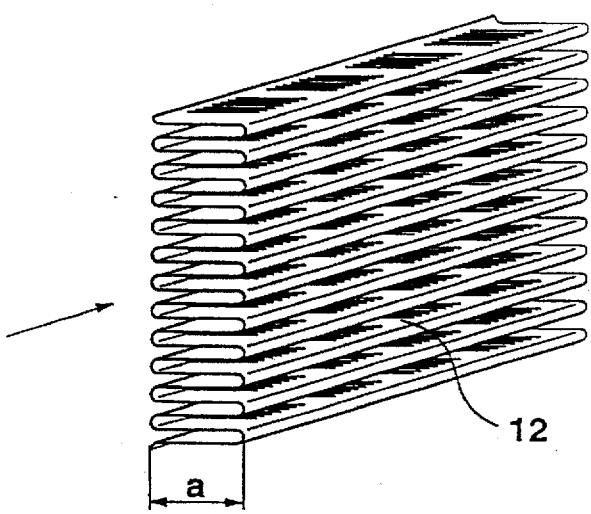
FIG. 7 is a perspective partial view of another corrugated fin also used for the construction of the finned tube block according to the invention.

As illustrated particularly in FIGS. 4 and 5, the flat tubes 7 of the finned tube block 1 are arranged at a distance (a) with respect to one another, and this space with the width (a) is filled out by lamella-type corrugated fins according to FIG. 7, with the exception of the area of the expansion joints 8 and of an area which ends with the plane 9 which is situated by the extent (c) behind the inlet plane 10 of the charge air cooler. In the latter area which is bounded in the flow direction 5 by the plane 9 and which corresponds approximately also to the area of the flange 6, corrugated fins 11 (FIG. 6) are inserted between adjacent flat tubes 7 which corrugated fins 11 differ from the corrugated fins 12 in the remaining finned tube block in that they are not provided with slots 13 and also are folded among one another at a larger distance. The surface of the corrugated fins 11 is therefore significantly smaller than that of the corrugated fins 12. By arranging the corrugated fins 11 in the inlet area, it is therefore achieved that here the heat transmission of the hot charge air to the flat tubes is limited.

Figure 8:
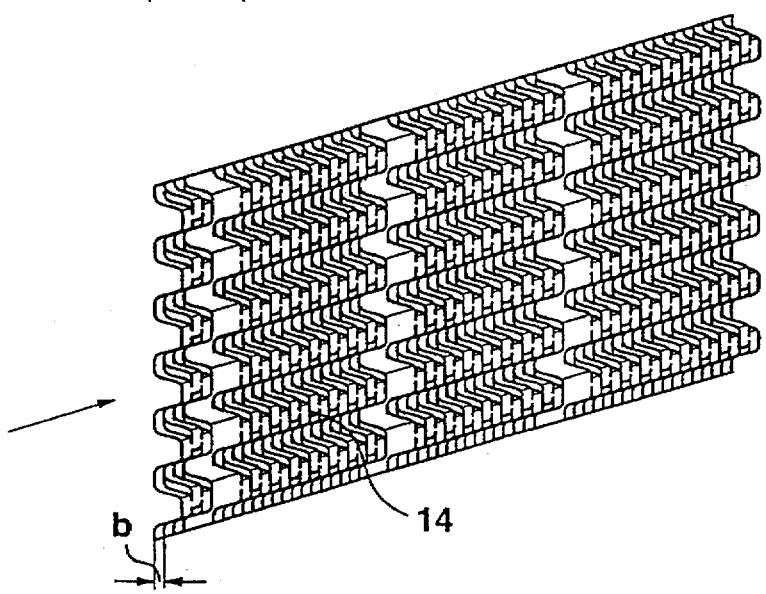
FIG. 8 is a view of another type of corrugated fins used for the construction of the finned tube block according to the invention.

The expansion joints 8, which extend down to the depth (d) in the flow direction 5 into the finned tube block, are formed in that respective corrugated fins 14 are soldered to the tubes 7 on both sides adjoining the gap forming the expansion joint 8, which corrugated fins 14 may correspond in their construction of FIG. 8 and in the flow direction 5 may have the width (b) which corresponds to approximately one third of the width (a) by which adjoining flat tubes 7 are spaced. The gap therefore remains between the corrugated fins 14 which forms the expansion joint 8 which, as mentioned above, extends only as far in the flow direction 5 into the finned tube block 1 as an endangering of the corrugated fins by an excessive heating by the entering air must be feared. In the case of a preferred embodiment, it was found that even at a depth of d=60 mm, a cooling takes place of a charge air entering with approximately 230° C. to approximately 120° so that the expansion joints 8 do not have to be placed any farther into the finned tube block. It was also found that the two expansion joints 8 illustrated in FIG. 1 are sufficient for permitting an expansion in the transverse direction for the finned tube block or its corrugated fins which can result in no damage.

It is also contemplated according to preferred embodiments of the invention to provide, instead of the embodiment of the corrugated fins 14 illustrated in FIG. 8, other embodiments which are soldered to the tube walls. It is advantageous with these preferred embodiments that the mutually facing walls of the tubes 7 in the area of the expansion joint 8 are also supported against pressure on their mutually facing side which can easily take place as a result of the construction of corrugated fins.

The figures also show that the lateral parts 4 are provided with cooling ducts 15 which, on the one hand, are used for the cooling of the lateral parts but, as a result of the selected design, are also used for the cooling of the corrugated fins 12' each adjoining the lateral parts. In the embodiment shown, for this purpose, a separating metal sheet 16 is soldered to the side of the corrugated fins 12' facing toward the outside, and this separating metal sheet 16 is contacted directly by the cooling water which flows through the cooling ducts 15. As a result of this measure, the outermost corrugated fins 12' in the area of the lateral parts are also largely prevented from expanding transversely which contributes to the fact that here no damage to the corrugated fins can occur in the area of the frame formed by the lateral parts and the water boxes.

By means of the design illustrated in the embodiment shown, which only by way of the depth with the dimension (d) in the inlet area is provided with two continuous gaps, a stiff block connection remains for the power transmission and for transmitting mechanical tensions. As a result, the central block area according to FIG. 1 or 2 in the area of the expansion joints 8 on the charge air inlet side can move to the left or to the right. Since the lateral parts do not change, the respective outer blocks can also move toward the block center.

The whole finned tube block may be soldered together as a one piece unit according to preferred embodiments of the invention. This construction avoids reduction in performance and complications of the cooler block as compared to several independent blocks because of additional welded connections or measures with lateral metal sheets bent at right angles.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A charge air cooler comprising:
   a substantially rigid frame composed of two opposed water boxes and two lateral frame parts connecting the water boxes, and
   a finned tube block inserted in said frame and disposed to accommodate air flow from an air inlet side to an air outlet side of the finned tube block,
   said finned tube block including flat tubes and lamella-type corrugated fins arranged between the flat tubes,
   wherein at least one gap in the form of an expansion joint is provided in at least two fins which are disposed between adjacent flat tubes and extends in parallel to the tubes along only a predetermined portion of the finned tube block in a flow direction of the air to thereby compensate for thermal expansion of the corrugated fins and consequent overstressing of the material during operation of the air cooler.

2. A charge air cooler comprising:
   a substantially rigid frame composed of two opposed water boxes and two lateral frame parts connecting the water boxes, and
   a finned tube block inserted in said frame and disposed to accommodate air flow from an air inlet side to an air outlet side of the finned tube block,
   said finned tube block including flat tubes and lamella-type corrugated fins arranged between the flat tubes,
   wherein at least one gap in the form of an expansion joint is provided which extends in parallel to the tubes and along the length of the tubes said at least one gap extending in a flow direction of the air only to a predetermined depth of the finned tube block at which, during the use of the charge air cooler, a temperature of the air is reached which no longer causes thermal expansion of the corrugated fins and consequent overstressing of the material, and
   wherein the at least one gap is formed as an expansion joint with a mutual spacing between two sets of said corrugated fins which have only a fraction of the width between adjacent tube walls and which each rest against a respective tube wall and are soldered to the respective tube wall.

3. Charge air cooler according to claim 2, wherein the width of the two sets of corrugated fins amounts to approximately one third of the distance between the adjacent tube walls.

4. Charge air cooler according to claim 1, wherein said finned tube block includes corrugated fins in the air inlet side between adjacent tubes, said corrugated fins having a heat transmission capacity which is lower than that of slotted corrugated fins provided behind them in the air flow direction through the finned tube block.

5. Charge air cooler according to claim 4, wherein smooth accordion-folded metal bands are provided as the corrugated fins lower heat transmission capacity.

6. Charge air cooler according to claim 1, comprising cooling ducts arranged in the lateral frame parts, wherein the cooling ducts directly adjoin respective ones of the corrugated fins assigned to the lateral frame parts.

7. A charge air cooler comprising:
   a substantially rigid frame composed of two opposed water boxes and two lateral frame parts connecting the water boxes, and
   a finned tube block inserted in said frame and disposed to accommodate air flow from an air inlet side to an air outlet side of the finned tube block,
   said finned tube block including flat tubes and lamella-type corrugated fins arranged between the flat tubes,
   wherein at least one gap in the form of an expansion joint is provided which extends in parallel to the tubes and along the length of the tubes, said at least one gap extending in a flow direction of the air only to a predetermined depth of the finned tube block at which, during the use of the charge air cooler, a temperature of the air is reached which no longer causes thermal expansion of the corrugated fins and consequent overstressing of the material,
   wherein cooling ducts are arranged in the lateral frame parts and directly adjoin respective ones of the corrugated fins assigned to the lateral frame parts, and
   wherein the cooling ducts are bounded by thin metal wall sheets which are soldered to sides of the corrugated fins facing the cooling ducts.

8. Charge air cooler according to claim 6, wherein the cooling ducts are constructed as parts of the respective lateral frame part.

9. Charge air cooler according to claim 1, wherein said predetermined depth of the at least one gap is not greater than 60 mm.

10. Charge air cooler according to claim 1, wherein a total of two of said gaps are provided intermediate said lateral frame parts.

11. Charge air cooler according to claim 1, wherein one of the at least one gap is formed as an expansion joint with a mutual spacing between two sets of said corrugated fins which have only a fraction of the width between adjacent tube walls and which each rest against a respective tube wall and are soldered to the respective tube wall.

12. Charge air cooler according to claim 11, wherein the width of the two sets of corrugated fins amounts to approximately one third of the distance between the adjacent tube walls.

13. Charge air cooler according to claim 6, wherein the cooling ducts are bounded by thin metal wall sheets which are soldered to sides of the corrugated fins facing the cooling ducts.

* * * * *